United States Patent Office 3,433,536
Patented Mar. 18, 1969

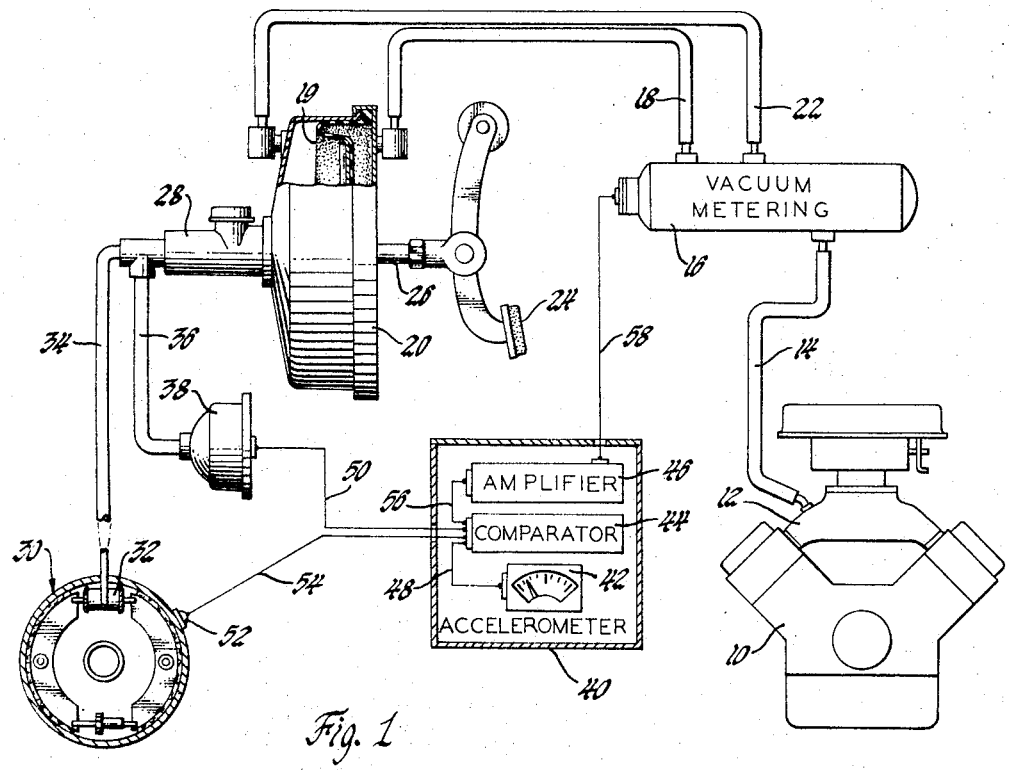

3,433,536
REGULATED ANTI-LOCK BRAKING SYSTEM
Kenneth R. Skinner, Anderson, Ind., assignor to General Motors Corporation, Detroit, Mich., a corporation of Delaware
Filed Oct. 11, 1967, Ser. No. 674,418
U.S. Cl. 303—21                    8 Claims
Int. Cl. B60t 8/02, 13/10

ABSTRACT OF THE DISCLOSURE

A vehicle wheel brake anti-lock system sensing vehicle deceleration and brake line pressure and generating control signals from the sensed conditions which ultimately control the brake apply pressure to prevent vehicle wheel lock and permit a high level of controlled braking force. Brake temperature is also sensed in the system when consideration is to be given to changes in brake lining coefficient of friction due to change in brake temperature.

---

The invention relates to a vehicle braking system in which the wheel brakes are controlled so as to prevent wheel lock and maintain brake operation at a high braking force level. This is accomplished by comparing actual vehicle deceleration and brake line pressure changes with an optimum relationship which will provide maximum braking force coefficient under variable road surface conditions. The system operates under the principle that there is a direct relationship between maximum vehicle deceleration and road surface conditions. The system evaluates the particular road surface condition and determines the maximum allowable braking force. Signals generated in accordance with the sensed conditions are utilized to control the power delivered to a brake line pressure generator so that the relationship between vehicle deceleration and brake line pressure is maintained within desirable limits relative to an optimum relationship. While the system will operate in a satisfactory manner by sensing only these two conditions, the system may also be provided with a brake temperature sensor which modifies the signals to take care of high brake temperature conditions which require a higher brake line pressure for attaining the desired vehicle deceleration under the particular road surface condition encountered.

In the drawing:
FIGURE 1 is a schematic illustration of a vehicle brake system embodying the invention, with parts thereof being illustrated in section;
FIGURE 2 is a graph illustrating the relationship of the brake force coefficient to the percent wheel slip under various road surface conditions;
FIGURE 3 is a graph showing a relationship of vehicle deceleration to brake line pressure which will give optimum braking of a particular system.

The system illustrated in FIGURE 1 is embodied in a vehicle having an engine 10 provided with an intake manifold 12 which acts as a source of power for the vehicle brake system. The power in this instance is subatmospheric pressure commonly referred to as engine intake manifold vacuum. A conduit 14 connects the engine intake manifold to a vacuum metering device 16. Conduit 18 connects the device 16 to a suitable chamber on one side of a suitable differential pressure operated power wall 19 of typical construction and utilized in a brake booster 20. When vacuum is applied through conduit 18 the booster acts to release the brakes. Another conduit 22 connects the device 16 to a suitable chamber on the other side of the power wall 19. This is the usual vacuum apply conduit for the booster. Since the booster is of typical well-known construction, no internal details are illustrated.

The booster is operated by the vehicle operator through a brake pedal 24 which actuates a push rod 26 to control the booster valves. The booster power wall 19 is operatively connected to the master cylinder 28 which generates hydraulic brake line pressure to actuate the vehicle wheel brakes 30. The master cylinder is connected to the brake wheel cylinder 32 of each vehicle wheel brake assembly being controlled by conduit means 34. It is contemplated that any suitable hydraulic braking connections between the master cylinder assembly 28 and the vehicle wheel brakes 30 may be utilized. The conduit 36 is connected to transmit brake line pressure to the pressure sensor 38 so that the brake line pressure being sensed is the same as the brake pressure being delivered to the particular vehicle wheel brake or brakes 30 to be controlled to prevent wheel lock. If, for example, the master cylinder assembly is of the dual chamber type with one chamber pressurizing the vehicle front wheel brakes and the other chamber pressurizing the vehicle rear wheel brakes and the rear wheel brakes are to be those controlled by the anti-lock portion of the system, the sensor 38 would sense the brake line pressure being delivered to the rear wheel brakes.

A control assembly 40 is schematically illustrated as including a vehicle accelerometer 42 which senses negative vehicle accelerations, a signal comparator 44, and an amplifier 46. The comparator 44 is connected by suitable signal transmission lines 48 and 50 to receive vehicle deceleration signals generated by the accelerometer 42 and brake line pressure signals generated by the presssure sensor 38. A brake temperature sensor 52 is also provided and utilized when it becomes desirable or necessary to consider brake operating temperature in order to more exactly control the vehicle brake system. A signal transmission line 54 interconnects the brake temperature sensor 52 and the comparator 44. As will be further described below, the comparator 44 generates a signal and transmits it through signal transmission line 56 to the amplifier 46. The amplified signal is then transmitted through signal transmission line 58 to the vacuum metering device 16, which controls the power being delivered to the booster 20.

As FIGURE 2 illustrates, a relationship exists between the road surface and the tire portion of the vehicle wheel which will provide a maximum braking force. This condition is known as tire-road adhesion and may be mathematically expressed as braking force coefficient (BFC). The braking force coefficient is defined as the braking force exerted by the road on the tire, divided by the vehicle weight acting on the tire. For any given road surface there is an optimum vehicle wheel slip that will provide a maximum braking force on the vehicle. As is shown in FIGURE 2, the relationship of the braking force coefficient and the percent wheel slip is illustrated for three different typically encountered road conditions. Curve 60 shows this relationship for a dry, paved road. Curve 62 illustrates this relationship for the same road when the road is wet. Curve 64 illustrates the relationship when the road has an icy surface. As can be seen by the curves, an optimum wheel slip for maximum braking force directly depends on the road surface conditions and varies from approximately 6 percent for icy roads to approximately 22 percent for dry, paved roads. The ideal vehicle wheel anti-lock device should sense the particular instantaneous road condition encountered and allow the wheel slip percentage to never exceed the point of maximum braking force coefficient. Examination of the curves in FIGURE 2 shows that all of these curves have an identical initial slope along line 66, and that the continuous straight line 68 can be drawn through the maximum braking force coefficient point of each curve.

A vehicle on wet pavement with the brakes applied will be subjected to an increasing braking effect until the braking force coefficient of approximately .55 and approximately 15 percent wheel slip is experienced. Any further attempt to stop the vehicle at a faster rate would merely result in an increase in vehicle wheel slip and a corresponding decrease in braking force coefficient. Therefore the ideal operating area for a system is restricted to the area left of line 68 in FIGURE 2. If we measure vehicle wheel slip and the braking force coefficient and use the relationship described by line 68 in FIGURE 2, we have an answer to the problem of brake anti-lock control since a particular wheel slip is associated with a particular value of braking force coefficient, and any deviation from this relationship beyond predetermined practical limits would cause the system to react. Since the percentage of wheel slip is a relationship between the vehicle velocity and the wheel velocity, and sensing this relationship would require additional devices beyond those shown in FIGURE 1 in order to sense with accuracy, and braking force coefficient is not directly measurable, other relationships must be used. There is a direct relationship between braking force coefficient and vehicle deceleration. Therefore the accelerometer 42 can directly measure vehicle deceleration and generate a signal that is related to the braking force coefficient.

As is shown in FIGURE 3 by curve 70, the relationship between vehicle deceleration and brake line pressure is a linear function when the vehicle brake system is operating along line 70 of FIGURE 2. This relationship has been established by empirical data taken under actual operating conditions with a vehicle. In different vehicles the relationship will be different, but the relationship shown includes typical values. The relationship is not linear when there is excessive wheel slip so that the system operates on a portion of the curve 60, for example, to the right of line 68. However, this creates no problem in the system. Assuming that there is no brake fade, for every given brake line pressure there is a corresponding ideal vehicle deceleration which follows line 70. When a lower than ideal deceleration value is obtained by a specific brake line pressure as shown in FIGURE 3, excessive wheel slip for the particular road condition being experienced occurs. Since vehicle deceleration can be equated to braking force coefficient, the results of the lower than ideal vehicle deceleration are shown in FIGURE 2 as excessive wheel slip. Therefore the system is set up so that any deviation from the relationship shown in FIGURE 3, within predetermined limits, will cause the system to react to bring the brake line pressure to the value which will result in the optimum vehicle deceleration. This will therefore provide optimum vehicle brake force under the particular conditions occuring at the time of braking.

Brake fade is the decrease in brake lining coefficient of friction which bears a relationship to brake temperature. The system of FIGURE 1, without the brake temperature sensor, would sense a braking condition in which some brake fade is occurring as an excessive wheel slip condition approaching wheel lock. Since the ideal vehicle deceleration value would not be obtained for the particular brake line pressure value occurring, a decrease in the brake lining coefficient would be reflected into the system as a signal that would dictate a release of brake line pressure. By sensing the brake temperature and feeding the temperature signal into the comparator 44, a modified optimum ratio between brake line pressure and vehicle deceleration can be generated. Thus a brake fade correction factor can be programmed into the system. The curve 72 of FIGURE 3 may then be the optimum curve for this condition.

When the vehicle brakes are applied by the vehicle operator through action of pedal 24, brake line pressure is delivered to the brake wheel cylinders 32. Vacuum from the engine intake manifold 12 is utilized to boost the manual force to generate braking pressures in the master cylinder 28. The brake line pressure is sensed by sensor 38 and the signal is transmitted to the comparator 44. Likewise, the vehicle deceleration obtained due to the braking action is sensed by accelerometer 42 and is transmitted to the comparator 44. If the ratio of vehicle deceleration to the brake line pressure is correct as determined by curve 70 of FIGURE 3, the comparator keeps the amplifier 46 turned off and the vacuum metering device allows vacuum to be applied to the booster 20 through conduit 22 in the normal operating fashion. Thus under these conditions the brake system functions normally. Should the ratio of vehicle deceleration to brake line pressure deviate sufficiently from that of curve 70, the vehicle is considered to have excessive wheel slippage. The comparator senses the incorrect ratio and turns on the amplifier which in turn generates a signal transmitted to the metering device 16, causing that device to prevent vacuum from being applied to the normal brake apply conduit 22, and instead applies vacuum to the brake release conduit 18. This action causes a fast brake release by forcibly causing the booster 20 to release the braking force applied to the master cylinder 28. As soon as the comparator 44 senses a correct ratio, the normal vacuum brake conduit 22 again receives vacuum and the brake release conduit 18 is disconnected from the vacuum source. Thus the brakes are again applied to the full extent consistent with the force exerted by the operator on the brake pedal 24.

While the system shown includes direct booster power pressure control, the portions of the system including sensors 38, 42 and 52 and control assembly 40 may be used to control a brake apply pressure modulator of the general type disclosed and claimed in application Ser. No. 674,416 filed Oct. 11, 1967, by Robert A. Horvath, entitled "Pressure Modulator Valve for Anti-Lock Brake System," and assigned to the common assignee.

What is claimed is:

1. A vehicle wheel brake anti-lock system comprising:
a brake line pressure sensor and signal generator;
an accelerometer and signal generator sensing negative vehicle accelerations and generating signals accordingly;
a comparator and signal generator connected to receive signals from each of said earlier-named signal generators;
control means including
a fluid pressure powered brake booster assembly for generating sensed brake line pressure delivered to a vehicle wheel brake,
a source of fluid pressure for powering said booster,
metering means for fluid pressure being delivered to said booster from said source,
and means transmitting signals from said comparator and signal generator to said metering means;
said comparator and signal generator comparing brake line pressure signals and accelerometer signals to a known optimum-braking ratio of brake line pressure to vehicle deceleration,
and when the ratio of the received signals departs from the optimum-braking ratio beyond predetermined limits generating and sending signals through said transmitting means to said metering means to cause said metering means to change the fluid pressure delivered to said booster assembly from said source to decrease brake line pressure to re-establish the comparator received signal ratio within the predetermined optimum-braking ratio limits.

2. The system of claim 1 further comprising a brake lining temperature sensor and signal generator delivering signals to said comparator reflecting changes in brake lining coefficient due to heat and providing a brake fade correction factor to said comparator to establish a modified optimum-braking ratio of brake lining pressure to vehicles deceleration to which said brake lining pressure and said accelerometer signals are compared, thereby permitting generation of higher brake lining pressure in relation to vehicle deceleration before causing said metering means to act on the booster fluid pressure power to decrease brake line pressure.

3. A method of vehicle wheel brake operation comprising the steps of:
 (a) generating brake line pressure and actuating a vehicle wheel brake therewith to decelerate the vehicle,
 (b) sensing vehicle deceleration and generated brake line pressure,
 (c) generating signals reflecting the sensed deceleration and pressure,
 (d) comparing the generated signals to an optimum ratio of brake line pressure to vehicle deceleration from maximum brake force coefficient in relation to vehicle wheel slip,
 (e) generating a brake pressure modification signal when the comparison of the generated signals to the optimum ratio exceeds a predetermined allowable limit indicating excessive brake pressure for the vehicle deceleration attained,
 (f) modifying the generated brake line pressure in accordance with the modification signal to return the sensed pressure and deceleration within the allowable limit in relation to the optimum ratio,
 (g) and reapplying brake line pressure when the optimum ratio of brake line pressure to vehicle deceleration is reattained within the predetermined allowable limit.

4. The method of claim 3 further comprising the steps of:
 (a) sensing brake temperatures as indicia of brake fade and generating signals accordingly,
 (b) and modifying the optimum ratio of brake line pressure to vehicle deceleration in accordance with the generated brake temperature signals to correct for the brake fade condition to permit higher brake line pressures actuating the vehicle wheel brake in relation to the vehicle decelerations attained.

5. A method of determining actual vehicle tire-road adhesion under a variety of road surface conditions normally encountered by a vehicle and affecting the braking ability of the vehicle and establishing brake actuating control condition signals which can be utilized to prevent actual vehicle tire-road adhesion from decreasing subsequent to attainment of the maximum vehicle tire-road adhesion attainable under the road surface condition being encountered even though the brake actuating control condition increases beyond that causing the attainment of the maximum attainable vehicle tire-road adhesion, said method comprising the steps of:
 (a) generating a signal reflecting braking force coefficient as defined by the braking force exerted by the road on the tire divided by the vehicle weight acting on the tire,
 (b) establishing an optimum relationship between braking force coefficient and an actual brake actuating control condition,
 (c) sensing the actual brake actuating control condition and generating a signal responsive thereto,
 (d) comparing said signals to the established optimum relationship,
 (e) and generating a brake actuating control condition control signal for controlling the brake actuating control condition to limit vehicle tire-road adhesion to the maximum attainable under the road surface condition being encountered.

6. The method of claim 5, said signal reflecting braking force coefficient being generated by a vehicle deceleration sensing accelerometer directly measuring vehicle deceleration.

7. The method of claim 5 in which step (b) more particularly comprises establishing an optimum relationship between braking force coefficient and the vehicle brake line pressure actuating the vehicle brake,
 step (c) more particularly comprises sensing the vehicle brake line pressure actuating the vehicle brake and generating a signal responsive thereto,
 and step (e) more particularly comprises generating a brake line pressure control signal for controlling the brake line pressure to limit vehicle tire-road adhesion substantially to the maximum attainable under the road surface condition being encountered.

8. A method of determining actual vehicle tire-road adhesion under a variety of road surface conditions normally encountered by a vehicle and affecting the braking ability of the vehicle and establishing brake operating condition signals which can be utilized to prevent actual vehicle tire-road adhesion from decreasing subsequent to attainment of the maximum vehicle tire-road adhesion attainable under the road surface condition being encountered even though the brake operating condition increases beyond that causing the attainment of the maximum attainable vehicle tire-road adhesion, said method comprising the steps of:
 (a) generating a signal reflecting braking force coefficient as defined by the braking force exerted by the road on the tire divided by the vehicle weight acting on the tire,
 (b) establishing an optimum relationship between braking force coefficient and an actual brake operating condition, this establishment including the steps of
  (1) sensing the brake temperature,
  (2) generating a brake temperature signal responsive thereto,
  (3) and modifying the optimum relationship accordingly from the optimum relationship normally established for the brakes operating at sufficiently low brake temperatures to have no effect on the braking force generated,
 (c) sensing the actual brake operating condition and generating a signal responsive thereto,
 (d) comparing said signals to the established optimum relationship,
 (e) and generating a brake operating condition control signal for controlling the brake operating condition to limit vehicle tire-road adhesion to the maximum attainable under the road surface condition being encountered.

References Cited
UNITED STATES PATENTS 3,131,975   5/1964   Smith et al. _____ 303—21
3,235,036   2/1966   Meyer et al.

FERGUS S. MIDDLETON, *Primary Examiner.*
J. J. McLAUGHLIN, Jr., *Assistant Examiner.*

U.S. Cl. X.R.
303—6; 188—181